Patented Feb. 19, 1924.

1,484,444

UNITED STATES PATENT OFFICE.

JOHN MacNAULL WILSON, OF MONTCLAIR, NEW JERSEY; CORA ELLSWORTH WILSON, EXECUTRIX OF SAID JOHN MacNAULL WILSON, DECEASED, ASSIGNOR TO WILSON-IMPERIAL COMPANY, A CORPORATION OF DELAWARE.

COMPOSITION OF MATTER.

No Drawing. Application filed May 21, 1920. Serial No. 383,047.

*To all whom it may concern:*

Be it known that I, JOHN MacNAULL WILSON, a citizen of the United States, and resident of Montclair, in the county of Essex and State of New Jersey, have invented certain new and useful Improvements in Composition of Matter, of which the following is a specification.

The invention relates to a composition of matter for loosening the coating which accumulates on exposed protective coatings, such as railroad cars.

One of the objects of this invention is to provide a simple and economically compounded detergent free from soap which can be applied cold to the surface under treatment, clean the surface effectively without any excessive rubbing, agitating or other laborious action and which can be readily removed with the loosened dirt by a simple water rinsing operation and leave the surface cleaned with substantially its original lustre.

Another object of the invention is to provide a cleaner of the class described, which will act rapidly and effectively and which can be used with or without dilution, cause no deleterious action to the workman, or the protective coating from which dirt has been removed.

This object is attained by combining with hydrochloric acid which may be the ordinary commercial 22° acid, colloidal and organic flocculent medium (one form of which is Karaya Persian or Indian gum) and aids in giving body to the finished product in forming the same into a flocculent mass resembling an emulsification and in distributing the acid effectively. To the mixture of gum and acid is added glycerine to prevent drying and to prevent freezing and to the ingredients thus outlined is added water so as to form a permanent water soluble solution of the ingredients.

While these ingredients have been combined in different proportions, one commercial form of the composition which has given highest satisfaction is compounded in the following proportions:—

|  | Ounces. |
|---|---|
| Hydrochloric acid | 32 |
| Gum (Karaya) | 2 |
| Glycerine | 2 |
| Water (sufficient to make up one gallon). | |

Gum tragacanth is to be regarded as the chemical equivalent of the gum Karaya.

Acid in a volume as low as 10 ounces has been used but the composition is somewhat slow and when acid as high as 40 parts has been used the usual difficulty has arisen in the transportation of such strong acids in wooden packages. When the organic emulsifying agent, as Karaya, has been used in a proportion as low as one ounce, the emulsion action is hardly apparent and when as much as three ounces are used the substance is liable to deposit on surfaces and become difficult to remove. It will thus be seen that the most preferred proportions are approximately the ratio suggested in the table but this will vary depending upon the emulsifying agent used and the work in question upon which the material is to be used.

In preparing the composition one method suggested is to dissolve the gum into some of the water until a homogeneous consistency and freedom from lumps is attained. The glycerine is then added gradually and stirred into the gum syrup. Following this the acid is gradually added simultaneously with constant stirring.

The composition as thus marketed is indicated to be used at full strength under those situations where a particularly tenacious coating is present or where the dirt coating is old and tends to resist ordinary removal methods. The composition above outlined is designed for use only at full strength when the dirt on the protective coating is particularly tenacious. It can be diluted with water to any desired extent and where the ordinary dirt covering is present it is preferable to dilute to that point where the action will be effective without the loss of too much time. With a light dirt coating one-half strength is sufficient.

In practical use my composition is applied to the surface to be treated, with or without dilution, and allowed to soak in without being disturbed for ten or fifteen minutes. The surface is then rubbed with a stiff brush to loosen the now softened dirt-like deposit which still adheres to the surface and the loosened material is then washed down preferably with water, with or without the assistance of a brush, directing the stream in a sweeping manner downwardly and off the surface.

This composition can be used to advantage to cleanse exposed surfaces, such as car-sides, without endangering the operator in that the acid is not very strong. The substance has a free easy flow, is not gummy or sticky and readily mixed with water in all proportions, is non-abrasive, works easily under the brush, leaves no objectionable residue and leaves the cleaned protective coating with substantially its original gloss. Not only is the substance recommended for protective coatings and the like, but it can also be used effectively in cleaning glass and gives a high finished polish to the glass surface and leaves no residue on drying which is difficult to remove.

Having thus described my invention, I claim:

1. A composition of matter for use in cleaning protective coatings, said composition consisting of a mixture of a syrup consisting of gum Karaya solution and a solution of glycerine and hydrochloric acid.

2. A composition of matter for cleaning protective coatings comprising a mixture of hydrochloric acid, gum Karaya, glycerine and water approximately in the proportions of acid thirty-two ounces, gum Karaya two ounces, glycerine two ounces and water in an amount sufficient to make up one gallon.

3. A composition of matter for use in cleaning protective surfaces, consisting of a mixture of hydrochloric acid, gum Karaya and glycerine.

Signed at New York city, in the county of New York and State of New York, this 30th day of April, A. D. 1920.

JOHN MacNAULL WILSON.